(12) United States Patent
Kurosu et al.

(10) Patent No.: US 10,298,319 B2
(45) Date of Patent: May 21, 2019

(54) OPTICAL SWITCH, AND OPTICAL NODE MONITORING SYSTEM AND MONITORING METHOD

(71) Applicant: National Institute of Advanced Industrial Science and Technology, Chiyoda-ku, Tokyo (JP)

(72) Inventors: Takayuki Kurosu, Ibaraki (JP); Kiyo Ishii, Ibaraki (JP); Satoshi Suda, Ibaraki (JP); Shu Namiki, Ibaraki (JP)

(73) Assignee: National Institute of Advanced Industrial Science and Technology, Tokyo (JP)

( * ) Notice: Subject to any disclaimer, the term of this patent is extended or adjusted under 35 U.S.C. 154(b) by 0 days.

(21) Appl. No.: 16/061,941

(22) PCT Filed: Nov. 10, 2016

(86) PCT No.: PCT/JP2016/083328
§ 371 (c)(1),
(2) Date: Jun. 13, 2018

(87) PCT Pub. No.: WO2017/110286
PCT Pub. Date: Jun. 29, 2017

(65) Prior Publication Data
US 2019/0013863 A1    Jan. 10, 2019

(30) Foreign Application Priority Data

Dec. 21, 2015  (JP) .................................. 2015-248701
Feb. 15, 2016  (JP) .................................. 2016-025914

(51) Int. Cl.
*H04B 10/077*    (2013.01)
*H04B 10/071*    (2013.01)
(Continued)

(52) U.S. Cl.
CPC ....... *H04B 10/0775* (2013.01); *H04B 10/071* (2013.01); *H04B 10/077* (2013.01);
(Continued)

(58) Field of Classification Search
CPC ................ H04B 10/077; H04B 10/071; H04B 10/0775; H04Q 3/52; H04Q 11/0005; H04Q 2011/0016; H04J 14/0241
See application file for complete search history.

(56) References Cited

U.S. PATENT DOCUMENTS 6,704,508 B1     9/2004  Asahi
2008/0170855 A1*  7/2008  Kai .................... H04Q 11/0005
                                                 398/45

(Continued)

FOREIGN PATENT DOCUMENTS

JP    2000-358261 A    12/2000
JP    2008-167243 A     7/2008
(Continued)

OTHER PUBLICATIONS

Ishii, Kiyo et al., "Towards large-capacity, energy-efficient, and sustainable communication networks" Synthesiology, vol. 7, No. 1, pp. 43-56 (2014), and its English translation.
(Continued)

*Primary Examiner* — Mina M Shalaby
(74) *Attorney, Agent, or Firm* — McCormick, Paulding & Huber LLP

(57) ABSTRACT

It is an object to monitor signal flow (optically switched state) in an optical node without using a monitor light. In each of output ports of the optical node, a part of output signals is turned back, and the output signal light is subjected to intensity modulation or phase modulation, assigned port identification information, and allowed to reverse in the optical node. From an input port corresponding to the
(Continued)

reversed output signal, a plurality of signals turned back are output. The plurality of signals are appropriately converted into intensity modulation from phase modulation and separated by a device having a spectroscopic function, and identification information is read out based on an intensity of a signal light for each signal, thereby determining an optically switched state to an output port corresponding to the input port.

11 Claims, 19 Drawing Sheets

(51) Int. Cl.
    *H04J 14/02*     (2006.01)
    *H04Q 11/00*     (2006.01)
    *H04Q 3/52*     (2006.01)

(52) U.S. Cl.
    CPC ........... *H04J 14/0241* (2013.01); *H04Q 3/52* (2013.01); *H04Q 11/0005* (2013.01); *H04Q 2011/0016* (2013.01)

(56) References Cited

U.S. PATENT DOCUMENTS

| | | | | |
|---|---|---|---|---|
| 2012/0301141 | A1* | 11/2012 | Sakamoto | H04J 14/0204 398/48 |
| 2014/0010535 | A1* | 1/2014 | Oi | H04J 14/0212 398/48 |
| 2014/0348464 | A1* | 11/2014 | Kamura | H04B 10/0775 385/16 |
| 2015/0098696 | A1* | 4/2015 | Oi | H04J 14/0221 398/38 |
| 2015/0256251 | A1 | 9/2015 | Tamura | |
| 2015/0333835 | A1* | 11/2015 | Matsukawa | H04B 10/60 398/48 |
| 2016/0057514 | A1* | 2/2016 | Lord | H04J 14/0204 398/50 |
| 2017/0250752 | A1* | 8/2017 | Yuki | H04B 10/07955 |
| 2019/0013863 | A1* | 1/2019 | Kurosu | H04B 10/077 |

FOREIGN PATENT DOCUMENTS

| | | |
|---|---|---|
| JP | 2013-046166 A | 3/2013 |
| JP | 2015-170871 A | 9/2015 |
| WO | 2013/140493 A1 | 9/2013 |

OTHER PUBLICATIONS

Nakagawa et al., "Demonstration of Real-time FSK Light Labeling using DAC-Based Transmitter for 400G Superchannel," 41st European Conference of Optical Communication (ECO2015) Proceedings, Tu.3.5.6, Valencia, Spain (2015).

International Search Report for PCT Serial No. PCT/JP2016/083328 dated Jan. 31, 2017.

* cited by examiner

FIG. 7

| OUTPUT PORT NUMBER | INPUT PORT NUMBER | | | | | | | |
|---|---|---|---|---|---|---|---|---|
| | $\lambda_1$ | $\lambda_2$ | $\lambda_3$ | $\lambda_4$ | $\lambda_5$ | $\lambda_6$ | $\lambda_7$ | $\lambda_8$ |
| 1 | 4 | 3 | – | 1 | – | – | 2 | – |
| 2 | – | – | 2 | 3 | – | 4 | 3 | 1 |
| 3 | – | 1 | 3 | – | 2 | – | – | 4 |
| 4 | 2 | 4 | – | 4 | 3 | 1 | – | 2 |

FIG. 10

| INPUT PORT NUMBER | WAVELENGTH GRID (SIGNAL CENTER WAVELENGTH) | | | | | | | |
|---|---|---|---|---|---|---|---|---|
| | $\lambda_1$ | $\lambda_2$ | $\lambda_3$ | $\lambda_4$ | $\lambda_5$ | $\lambda_6$ | $\lambda_7$ | $\lambda_8$ |
| 1 | – | O | – | O | – | O | – | O |
| 2 | O | – | O | – | O | – | O | O |
| 3 | – | O | O | O | O | – | O | – |
| 4 | O | O | – | O | – | O | – | O |

FIG. 11

| INPUT PORT NUMBER | OUTPUT PORT NUMBER | | | | | | | |
|---|---|---|---|---|---|---|---|---|
| | $\lambda_1$ | $\lambda_2$ | $\lambda_3$ | $\lambda_4$ | $\lambda_5$ | $\lambda_6$ | $\lambda_7$ | $\lambda_8$ |
| 1 | – | 3 | – | 1 | – | 4 | – | 2 |
| 2 | 4 | – | 2 | – | 3 | – | 1 | 4 |
| 3 | – | 1 | 3 | 2 | 4 | – | 2 | – |
| 4 | 1 | 4 | – | 4 | – | 2 | – | 3 |

FIG. 12

| INPUT PORT | SIGNAL WAVELENGTH | DESIGNATED PORT | RETURN LIGHT WAVELENGTH | RETURN LIGHT PORT | NORMAL/ ABNORMAL |
|---|---|---|---|---|---|
| 100a | λ2 | 110c | λ2 | 110c | NORMAL |
|  | λ4 | 110a | λ4 | *110b | ABNORMAL |
|  | λ6 | 110d | λ6 | 110d | NORMAL |
|  | λ8 | 110b | λ8 | 110b | NORMAL |
| 100b | λ1 | 110d | λ1 | 110d | NORMAL |
|  | λ3 | 110b | λ3 | 110b | NORMAL |
|  | λ5 | 110c | λ5 | 110c | NORMAL |
|  | λ7 | 110a | λ7 | 110a | NORMAL |
|  | λ8 | 110d | λ8 | 110d | NORMAL |
| 100c | λ2 | 110a | λ2 | 110a | NORMAL |
|  | λ3 | 110c | λ3 | 110c | NORMAL |
|  | λ4 | 110b | λ4 | *110a | ABNORMAL |
|  | λ5 | 110d | λ5 | 110d | NORMAL |
|  | λ7 | 110b | λ7 | 110b | NORMAL |
|  | – | – | λ1 | *110a | ABNORMAL |
| 100d | λ1 | 110a | – | *– | ABNORMAL |
| ... |  |  |  |  |  |

OPTICAL SWITCH, AND OPTICAL NODE MONITORING SYSTEM AND MONITORING METHOD

CROSS-REFERENCE TO RELATED APPLICATIONS

This application is a National Stage application of International Patent Application No. PCT/JP2016/083328, filed on Nov. 10, 2016, which claims priority to Japanese Patent Application No. 2015-248701, filed on Dec. 21, 2015, and Japanese Patent Application No. 2016-025914, filed on Feb. 15, 2016, each of which is hereby incorporated by reference in its entirety.

TECHNICAL FIELD

The present invention relates to a system of monitoring signal flow between input/output ports in an optical node including an optical switch and a plurality of optical switches and a method thereof.

BACKGROUND

In recent optical communication, introduction of wavelength division multiplexing (WDM) has enhanced a high capacity network, and in order to achieve much higher capacity, further cost reduction, and lower power consumption, a technique transmitting an optical signal without performing optical/electrical/optical conversion has been developed.

In particular, an optical path network in which routing is performed by optical circuit switching, instead of packet switching (Kiyo Ishii, Jyunya Kurumida and Shu Namiki, "Toward large-capacity, energy-efficient, and sustainable communication networks", Synthesiology, vol. 7, no. 1, AIST, pp. 43-56.) achieves low delay and low power consumption by several orders of magnitude, and introduction of the optical path network to a data center has been also considered.

In such optical path network, a network management system collectively manages a plurality of optical nodes arranged, and an optical path whose bandwidth is compensated is provided between arbitrary end users.

The optical node is linked to an adjacent optical node through an optical fiber and has a function of outputting an arbitrary wavelength signal received by an arbitrary input port to an arbitrary output port.

The optical node may have various possible configurations, and in any cases, the optical node can be expressed as a switch having a plurality of input/output ports as in FIG. 1.

To an input port, a transmission signal from an adjacent optical node and an added client signal are input.

From an output port, a transmission signal to an adjacent optical node and a dropped client signal are output.

When the optical node has a small number of ports, the optical node can be configured such that an optical switch and a wavelength selective switch (WSS) can be used in combination.

FIG. 2 illustrates a configuration example in which an arrayed waveguide grating (AWG) and an optical switch are used in combination.

In this case, a WSS on an output side may be substituted by an optical multiplexer.

FIG. 3 illustrates a configuration example in which a (1 input, N output) WSS is used.

In this case, although a (1×N) WSS is used on both sides of input and output, one of them may be substituted by an optical splitter (splitter), and the number of ports N may not be in common to all WSSs.

For example, as a modification of FIG. 3, an asymmetric configuration illustrated in FIG. 4 may also be adopted.

In the configuration in FIG. 4, the optical splitter and the WSS inside are omitted in input/output ports #4 to #6. However, connecting an AWG, a transponder aggregator (TPA), and the like to these input/output ports can provide variation in the configuration of the optical node.

The TPA is also called a multicast switch and used in multiplexing/demultiplexing wavelengths of a plurality of client signals.

A typical TPA is a combination of an optical splitter and an optical switch, and its configuration example will be illustrated in FIG. 5.

Small-scale optical nodes illustrated in FIG. 2 to FIG. 4 are referred to as a wavelength cross connect (WXC) herein.

A large-scale optical node having several tens to several hundreds of ports is achieved by making a switch with a different switching granularity in a multilayer structure (Kiyo Ishii, Jyunya Kurumida and Shu Namiki, "Toward large-capacity, energy-efficient, and sustainable communication networks", Synthesiology, vol. 7, no. 1, AIST, pp. 43-56.).

FIG. 6 illustrates an optical node in a three-layer structure in which an OXC (optical cross connect) serving as an optical switch (FXC: fiber cross connect) switching a signal in units of a fiber, the above-described WXC switching a signal in units of a wavelength, and an optical data unit (ODU) switch switching an electrical path in units of time are arranged in three levels in combination.

Meanwhile, in order to understand an operation condition of an optical path network and detect a trouble, it is necessary to know signal flow on the network.

As a method therefor, Goji Nakagawa and others, "Demonstration of Real-time FSK Light Labaling using DAC-Based Transmitter for 400G Superchannel", 41th European Conference of Optical Communication (ECOC2015) Proceedings, Tu. 3. 5. 6, Valencia, Spain (2015), indicates a method in which identification information related to a transmitter is assigned to an optical signal upon transmission.

In this method, an optical node needs to recognize the identification information which is assigned to the signal. Accordingly, this optical node has a property dedicated to the transmitter used on the network.

When scalability and flexible operation of a network are considered, it is desirable that the optical node does not depend on a type of a transmitter and a transmission scheme to be used on the network, in other words, the optical node can be used for an arbitrary signal.

To achieve such purposes, it is necessary that the optical node has a function of monitoring signal flow inside the node by itself.

FIG. 7 illustrates a display example of a path monitoring in the optical node. For simplicity, an optical signal is compliant with the DWDM (dense wavelength division multiplexing) grid, and a center wavelength in the n-th grid is displayed as $\lambda_n$.

Also, due to a space on the paper, signals corresponding to eight DWDM grids ($\lambda_1$ to $\lambda_8$) only are displayed.

This path monitoring displays a wavelength of an optical signal output from each output port of an optical node and a port number to which the output optical signal is input.

When the optical node has such monitoring function, it is possible to constantly monitor signal flow on the network and build an optical path network having higher scalability.

SUMMARY

International Publication No. WO 2013/140493 indicates a method of monitoring an operation condition of a wavelength selective switch (WSS) by use of a monitor light.

When this method is applied to an optical node, it is possible to estimate a flow of a signal light through a flow of the monitor light.

Note that, however, a variable wavelength light source or a broadband light source needs to be prepared separately, whereby a configuration of the optical node becomes more complicated, causing higher costs.

As a simplest method to know signal flow in the optical node, it is conceivable to assign port identification information to a signal in each input port.

Identification information can be assigned by using intensity modulation and frequency modulation.

However, in order to prevent influence on other optical nodes, the identification information is required to be surely deleted from the signal before transmission, and it is significantly difficult to carry out this deletion.

In a special situation where an input port and an output port correspond to each other on a one-to-one basis, it is possible to prevent the above-described problem with the method indicated in Japanese Patent Application Laid-Open Publication No. 2000-358261.

More specifically, it is necessary to make a part of an output signal reflect, assign port identification information to the reversed signal thus reflected, and read it out on an input port side.

However, as for a commonly used optical node dealing with a WDM signal, a plurality of signals are input to one input port and output from different output ports depending on wavelengths.

Under such circumstance, even when the identification information is assigned to the reflected signal in each output port, a plurality of identification signals are tangled in the input port, so that it is impossible to understand signal flow.

The present invention is achieved in view of these matters, and provides a method of monitoring signal flow in an optical node without using a monitor light and affecting other optical nodes.

In an optical node according to the present invention, a part of an output signal in each output port turns back and is assigned port identification information to be reversed in the optical node.

From an input port, a plurality of signals which have been turned back from different output ports are output.

These signals are separated by a device having a spectroscopic function, identification information is read out for each signal, and determination of the corresponding output port is carried out.

In this scheme, since the port identification information is assigned to a reversed signal light (hereinafter, referred to as a reverse signal light or reverse light), the other optical nodes connected through the optical fiber on the network are not affected even if the port identification information is not deleted.

Also, since a monitoring light source is not required, it is possible to prevent a device from being more complicated and costs from increasing.

The optical node mentioned herein indicates a general device switching a plurality of WDM optical signals illustrated in FIG. 1, and includes not only a multilayered optical node and the WXC, but also a single WSS.

A basic configuration of an optical node to which the present invention is applied is illustrated in FIG. 8.

In this case, an operation will be described through a flow of a signal input to an input port 100b in an optical switch 6.

First, a part of an input signal is guided as a reference signal to an optical monitor unit by an optical splitter 61b.

A simple spectral measurement is carried out there, and it is confirmed that there are five signals and their center wavelengths ($\lambda_1$, $\lambda_3$, $\lambda_5$, $\lambda_7$, $\lambda_8$).

A switch is set such that these five signals are respectively output from output ports 110d (wavelength: $\lambda_1$), 110b (wavelength: $\lambda_3$), 110c (wavelength: $\lambda_5$), 110a (wavelength: $\lambda_7$), and 110d (wavelength: $\lambda_8$) of the optical switch 6.

Parts of the two signals (wavelengths: $\lambda_1$, $\lambda_8$) output from the output port 110d are split by an optical splitter 65d, and after respective pieces of identification information are assigned by use of a modulator 64d, the parts of the two signals are reversed to the output port 110d through an optical circulator 63d.

Similarly, the other three signals (wavelengths: $\lambda_3$, $\lambda_5$, $\lambda_7$) are assigned respective pieces of port identification information and then reversed to the output ports 110b, 110c, and 110a, respectively.

The modulator (64a to 64d) is driven by an electric signal from a label assignment unit 5 and assigns the identification information to the reverse signal light at a different pattern for each output port (in FIG. 8, displayed as $f_m$, where m is a, b, c, and d), for example, by being subjected to intensity modulation.

In this case, the reverse signal light may be simply subjected to intensity modulation at a different modulation frequency for each port determined in advance.

The intensity modulation at a different pattern is applied to each of the five reverse signal lights output from the input port 100b, and these lights are sent to the optical monitor unit 4 through the optical circulator 62b.

In the optical monitor unit 4, the five signals are separated by each wavelength, and then, an intensity-modulated pattern is measured to determine each output port.

The same operation is also carried out for the other input ports.

In the configuration of FIG. 8, assuming that a performance of the optical circulator is insufficient and leaking light may affect an adjacent node, an optical isolator (66a to 66d) is disposed on the input port side.

However, when any problem may be caused, this optical isolator may be omitted.

Also, each optical circulator may be substituted by an optical splitter.

For example, the optical circulator (62a to 62d) may be omitted, and it is possible to achieve a configuration in which a part of each of an input light and a reverse light is collected in the optical monitor unit 4 by using a (2×2) optical splitter, instead of the optical splitter (61a to 61d).

It is also possible to assign identification information to a reverse light by using a reflective semiconductor optical amplifier (RSOA), instead of an intensity modulator.

FIG. 9 illustrates a basic configuration of an optical node according to the present invention when the RSOA is used.

In each output port of the optical switch 6, a part of each output light is guided to each of the RSOAs (69a to 69d) through each of optical splitters (68a to 68d), and the amplified reflected light is reversed to each of the output ports (110a to 110d) through each of the optical splitters (68a to 68d).

In this case, intensity modulation is applied to a reverse signal by modulating a gain of the RSOA.

On the input side of the optical node 1, a (2×2) optical splitter (67a to 67d) is used to guide a part of an incident light and a reverse light to the optical monitor unit 4.

Also, the optical isolator (66a to 66d) is disposed to prevent the reverse light from affecting the adjacent optical node.

The foregoing description has been given an example in which the intensity modulator and the RSOA are used as a method of assigning identification information to a reverse light; however, the method is not limited to this example of using them.

For example, intensity modulation may be applied to a reverse light emitted from the input port by controlling a coupling efficiency of the reverse light and the output port.

Phase modulation may be used as means of assigning identification information. In this case, in order to make it possible to execute the same process as in the case of the intensity-modulated signal light described above and identify an output port with the intensity-modulation pattern in the optical monitor unit, a process of converting a phase-modulated signal light into an intensity-modulated signal light is required.

This can be achieved by allowing a signal subjected to phase modulation and a signal before being subjected to phase modulation to interfere with each other.

In general, an intensity of an interfering light changes depending on a phase difference between two optical waves as illustrated in FIG. 17.

Accordingly, when two optical waves interfere with each other at a phase difference corresponding to a halfway (B point, D point) of this interference pattern, that is, a ¼ wavelength difference, phase modulation of light is converted into intensity modulation, and the light is to be output.

For an optical phase modulator, a well-known technique such as a spatial light phase modulator and a fiber phase modulator.

FIG. 18 illustrates a basic configuration of an optical node when a phase modulation is used as means of port identification in the present invention.

A part of an input signal is split in front of each of the input ports (100a to 100d) by each of optical splitters (7a to 7d) and then, turned back by each of reflectors (8a to 8d).

This signal is referred to as an input reverse light.

On the other hand, a part of a signal output from each of the output ports (110a to 110d) is split by each of the optical splitters (65a to 65d) and subjected to phase modulation by each of phase modulators (9a to 9d) and then, reversed to each of the output ports (110a to 110d) through each of the optical circulators (63a to 63d).

This signal is referred to as an output reverse light.

The output reverse light is subjected to phase modulation at a different frequency (=$f_m$) for each output port.

After the output reverse light is emitted from each of the input ports (100a to 100d), the output reverse light and the input reverse light are multiplexed to be guided to the optical monitor unit 4 through each of the optical circulators (62a to 62d).

The multiplexed reverse light has an intensity modulation component of a frequency $f_m$, and by measuring this, identification of an output port is carried out.

In this case, it is not always required to have the same level in intensity between the input reverse light and the output reverse light.

For example, even when a ratio of these intensities is two orders of magnitude, the interfering light has at most about 20% intensity modulation component, whereby it is possible to easily identify.

For an actual device, there are some reflected leaking light from the input port, and it is possible to use this light as an input reverse light.

Accordingly, in most cases, it is allowed to omit the optical multiplexers (7a to 7d) and the reflectors (8a to 8d) for obtaining the input reverse light.

The optical monitor unit 4 has a spectroscopic function and measures a wavelength and an intensity of a signal contained in each reference input light in cooperation with the monitor control unit 2.

FIG. 10 indicates an example of measurement results of the reference input light.

For example, from this table, it is clear that five kinds of signals having wavelengths $\lambda_1$, $\lambda_3$, $\lambda_5$, $\lambda_7$, and $\lambda_8$, respectively, are input to an input port #2.

Also, the optical monitor unit 4 cooperates with the monitor control unit 2 to not only measure a wavelength and an intensity of a signal contained in each reverse light, but also identify a corresponding output port through which each reverse light passes.

FIG. 11 indicates an example of measurement results of the reverse light. In this case, it is clear that there are five reverse signals in the input port #2 and combinations of the wavelengths and the output ports of the signals are ($\lambda_1$, 4), ($\lambda_3$, 2), ($\lambda_5$, 3), ($\lambda_7$, 1), and ($\lambda_8$, 4).

When comparing the two measurement results, FIG. 10 and FIG. 11 in this case, if a presence or absence of a signal is not matched, it is possible to determine that a defect of the signal occurs inside the optical node.

When the table in FIG. 11 is rewritten such that a vertical axis and a horizontal axis are inverted, a table similar to one in FIG. 7 can be obtained. Accordingly, it may be possible to determine that a defect of a signal occurs inside the optical node by comparing them.

Moreover, when a signal intensity ratio of the reference input light and the reverse light is measured and stored as data before the device is used, it is possible to effectively use this data at the time of operating the device.

More specifically, at the time of operating the device, a signal intensity ratio is monitored and compared with the stored data, so that it is possible to understand degradation over times and occurrence of a trouble.

In general, in the optical node, switching of a path is carried out in accordance with a command from a network management system (not illustrated).

FIG. 12 indicates a display example in which measurement results by a path setting required and a path monitoring are filled in on the table, and it is possible to easily know an abnormal portion when the optical node does not operate normally.

For example, a signal having a wavelength $\lambda_4$ input to each of the input port 100a and the input port 100c is output from a port which is not a designated port, which is abnormal.

Also, a signal having a wavelength $\lambda_1$ input to the input port 100d is not output from any port, which is abnormal.

According to the present invention, it is possible to know signal flow in an optical node without preparing a light source separately.

BRIEF DESCRIPTIONS OF THE DRAWINGS

FIG. 7 is an example of a display unit in a path monitoring;

FIG. 10 is an example indicating a wavelength configuration of a WDM signal input to each input port of the optical node;

FIG. 11 is an example indicating a configuration of a reverse signal light emitted from each input port of the optical node;

FIG. 12 is a display example indicating an operation condition of the optical node;

DETAILED DESCRIPTION

Hereinafter, embodiments of the present invention will be described with reference to the drawings.

Note that the embodiments described below are examples only and are not intended to exclude various modifications and application of the technique.

More specifically, it is needless to say that the embodiments described below can be modified and executed within the scope of the present invention.

First Embodiment

Figure 13:
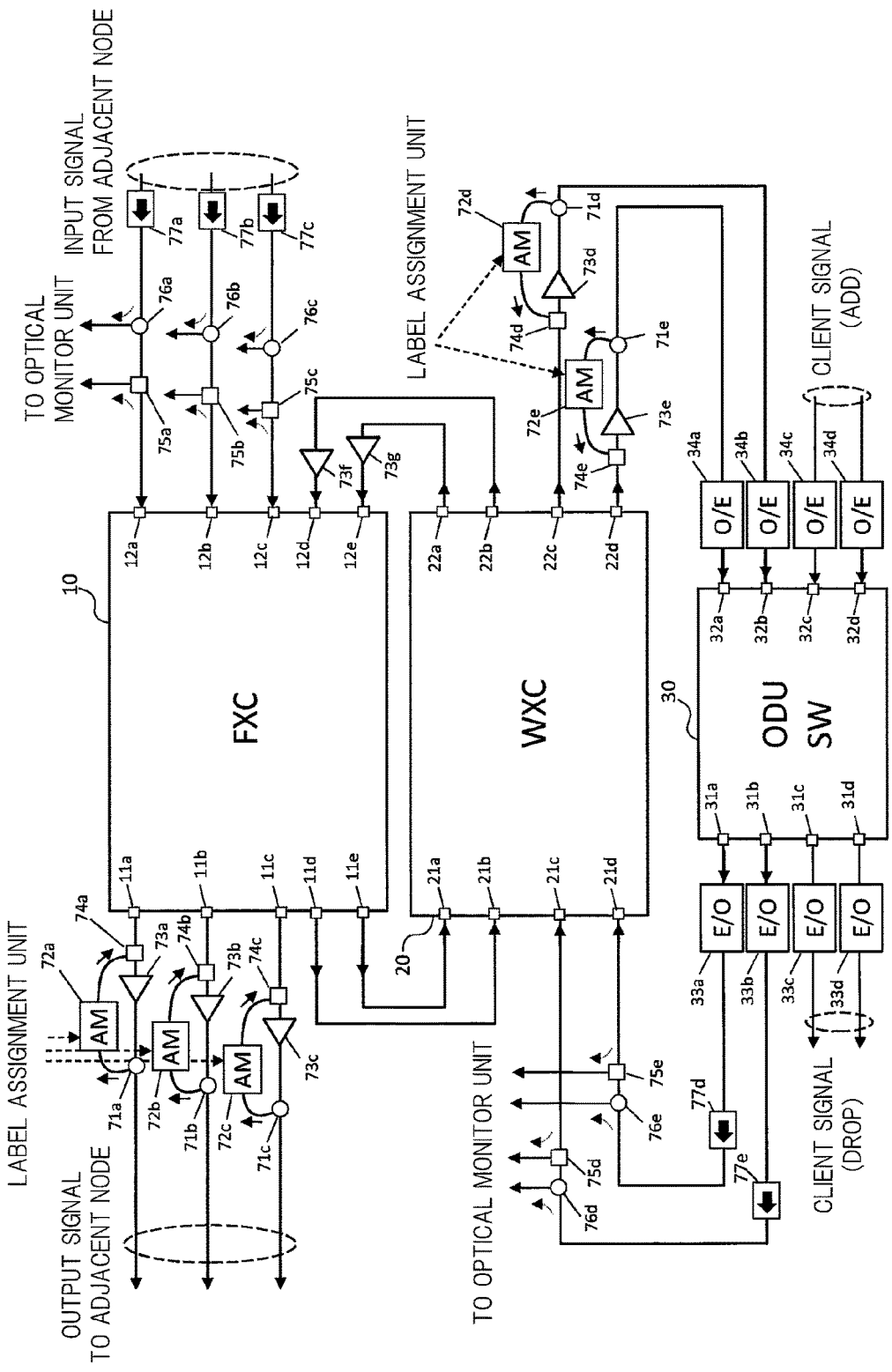
FIG. 13 is a diagram for explaining a first embodiment in which the present invention is applied to a three-layer optical node.

FIG. 13 illustrates a first configuration example in which the present invention is applied to a three-layer optical node.

An output light from an output port (11a to 11c) of an FXC 10 is amplified at an optical amplifier (73a to 73c) and transmitted to an adjacent node, and a part of the output light is guided to an intensity modulator (72a to 72c) through an optical splitter (71a to 71c) and assigned identification information to be then reversed to an output port through an optical circulator (74a to 74c).

Similarly, an output light from an output port (22c, 22d) of an WXC 20 is amplified at an optical amplifier (73d, 73e) and transmitted to an O/E converter (34a, 34b), and a part of the output light is guided to an intensity modulator (72d, 72e) through an optical splitter (71d, 71e) and assigned identification information to be then reversed to the output port (22c, 22d) through an optical circulator (74d, 74e).

A signal light which is reversed in the optical node is emitted from an input port (12a to 12c) of the FXC or an input port (21c, 21d) of the WXC and guided to an optical monitor unit through an optical circulator (75a to 75e).

Also, as a reference signal, a part of each of an input light from an adjacent node to the FXC and an input light from an E/O converter (33a, 33b) to the WXC is guided to the optical monitor unit through an optical splitter (76a to 76e).

The optical monitor unit cooperates with a monitor control unit and performs measurement of a wavelength and an intensity of a signal contained in a light to be monitored and identification of an output port.

In FIG. 13, the case in which performance of the optical circulator (75a to 75e) is insufficient is assumed, and an optical isolator (77a to 77e) is provided on an input port side; however, if any problem is caused, they may be omitted.

Also, in order to keep an optical signal intensity at an appropriate level, it is assumed that the optical amplifiers (73a to 73g) are used at several places, but they may also be omitted unless needed.

Second Embodiment

Figure 14:
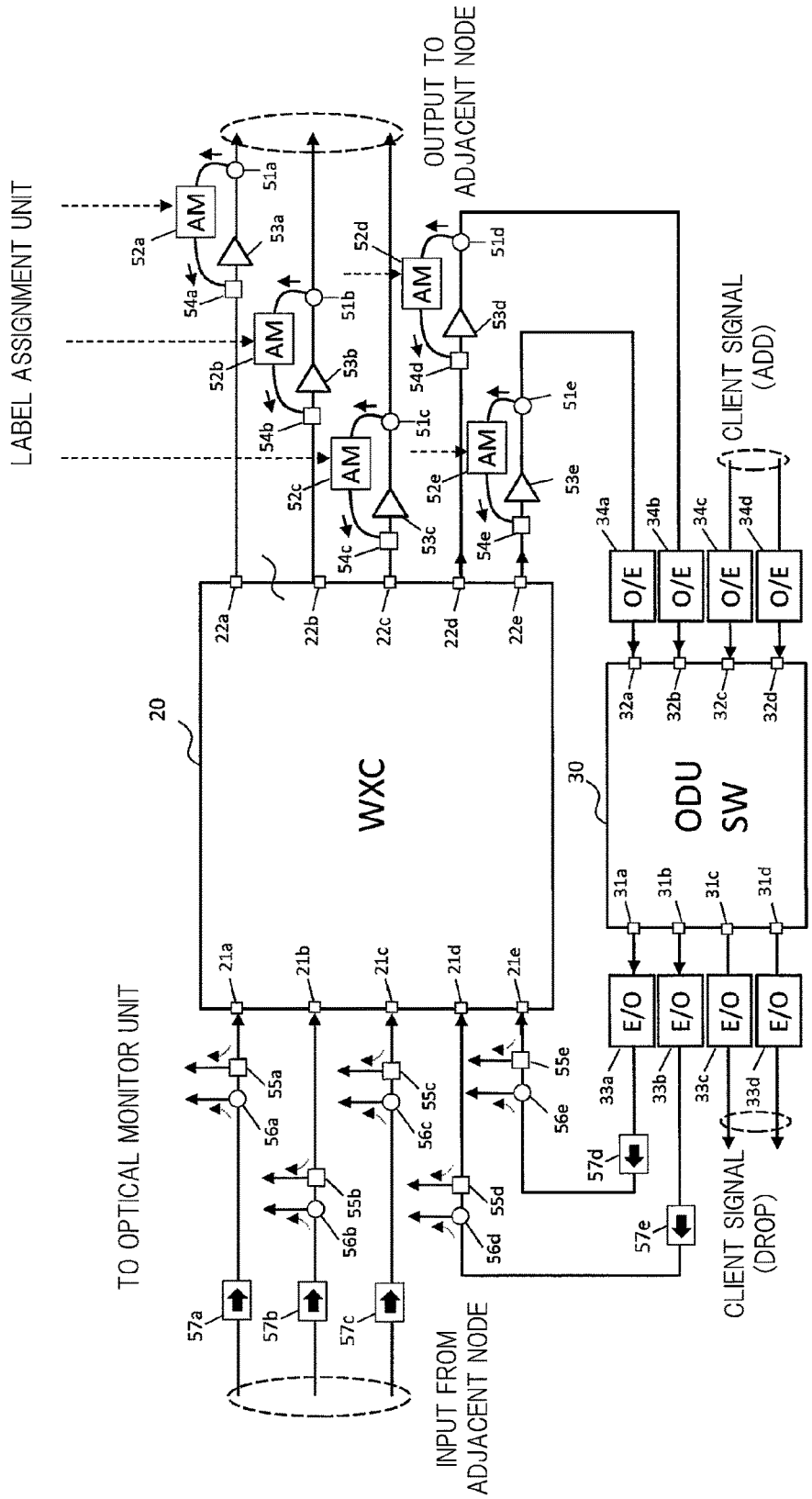
FIG. 14 is a diagram for explaining a second embodiment in which the present invention is applied to a two-layer optical node.

FIG. 14 illustrates a second configuration example in which the present invention is applied to a two-layer optical node. An output light from an output port (22a to 22e) of a WXC 20 is amplified by an optical amplifier (53a to 53e) and transmitted to an adjacent node or an O/E converter (34a, 34b), and a part of the output light is guided to an intensity modulator (52a to 52e) through an optical splitter (51a to 51e) and assigned identification information to be then reversed to the output port through an optical circulator (54a to 54e).

The reverse signal light emitted from an input port (21a to 21e) of the WXC is guided to an optical monitor unit through an optical circulator (55a to 55e).

Also, as a reference signal, a part of each of an input light from an adjacent node and an input light from an E/O converter (33a, 33b) is guided to the optical monitor unit through an optical splitter (56a to 56e).

The optical monitor unit cooperates with a monitor control unit and performs measurement of a wavelength and an intensity of a signal contained in a light to be monitored and identification of an output port.

The optical amplifiers and the optical isolators illustrated in the drawing may be omitted unless particularly needed.

Third Embodiment

Figure 15:
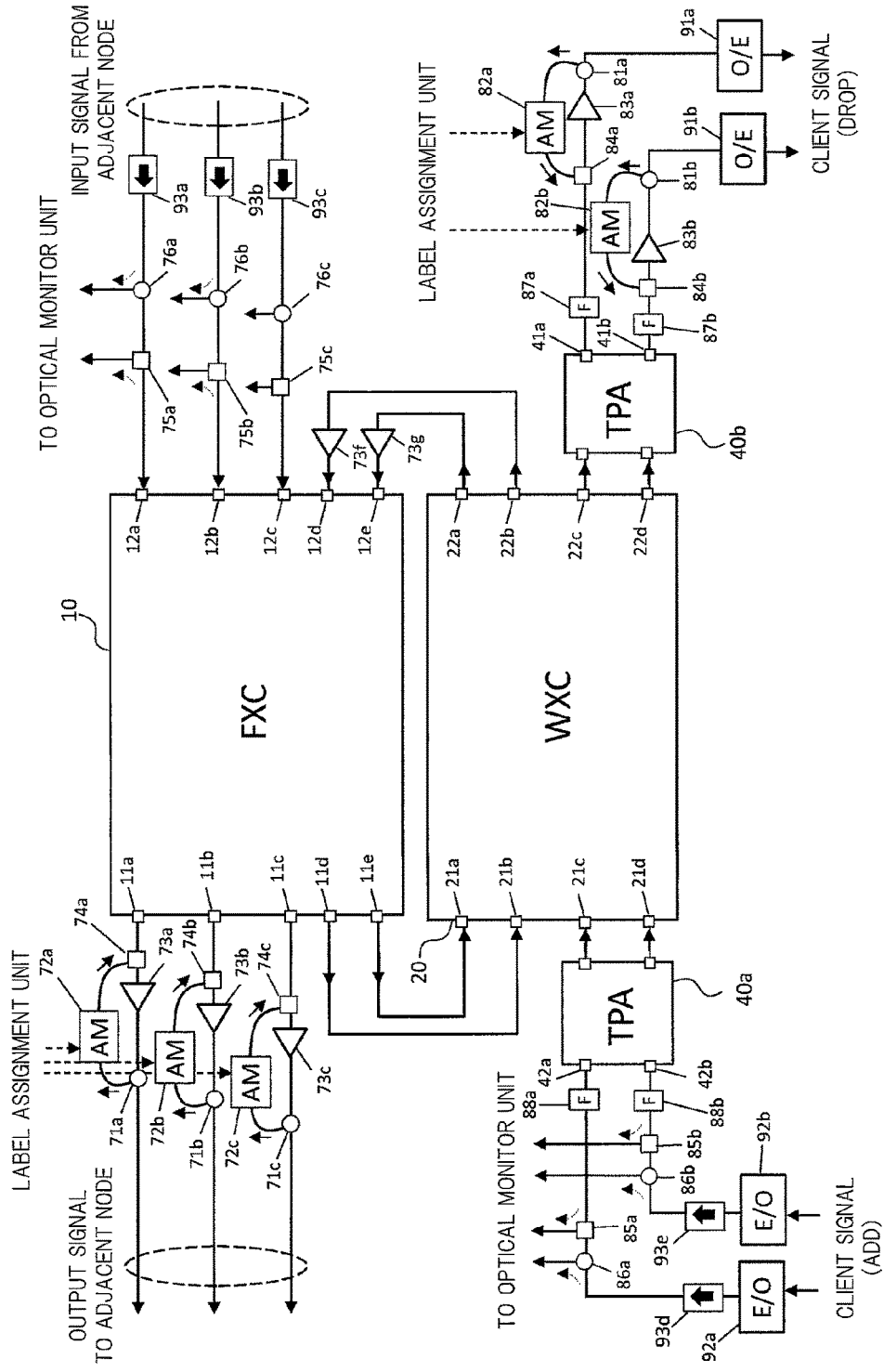
FIG. 15 is a diagram for explaining a third embodiment in which the present invention is applied to a two-layer optical node.

FIG. 15 illustrates a third configuration example in which the present invention is applied to a two-layer optical node.

Figure 1:
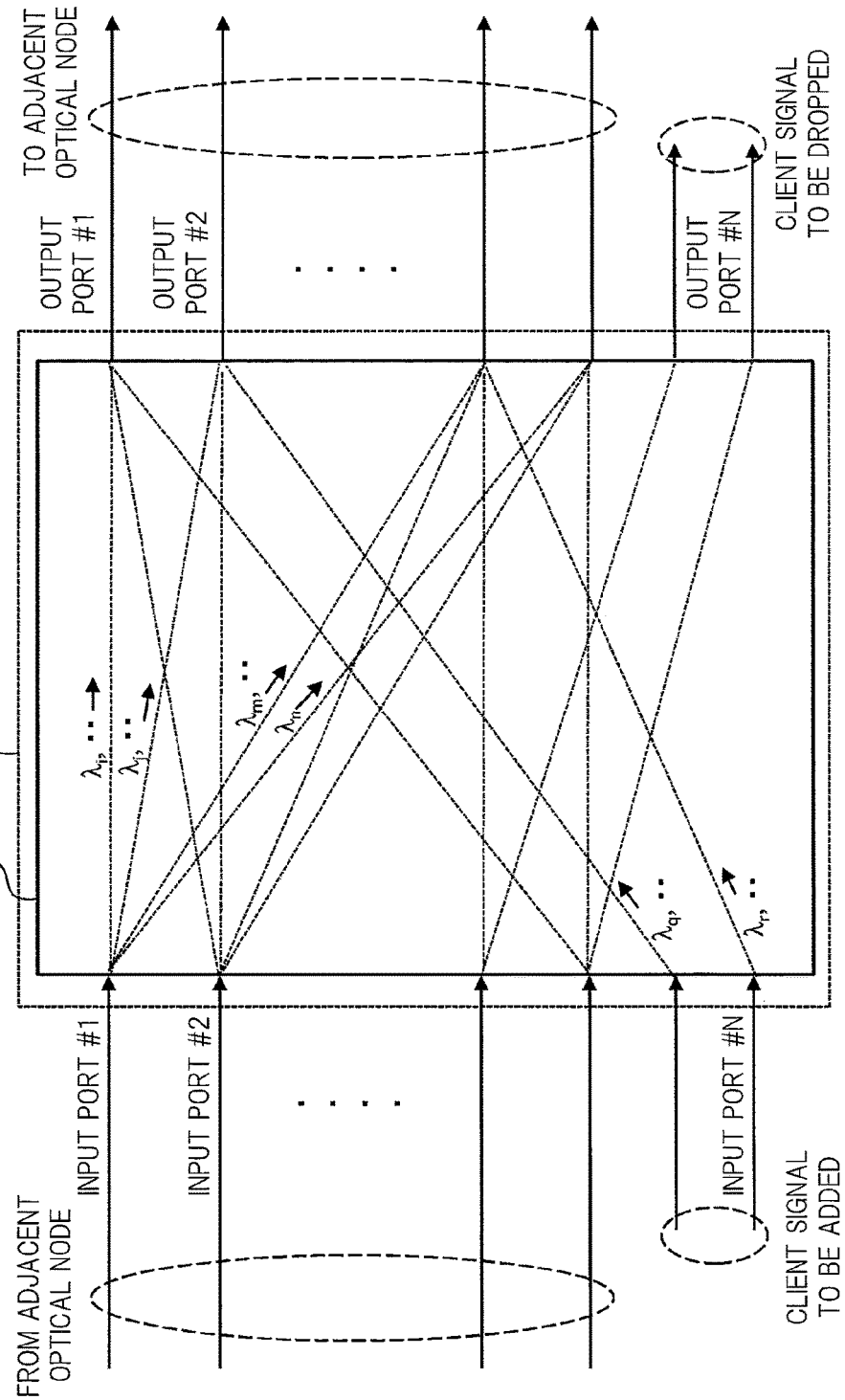
FIG. 1 is a diagram for explaining an optical node.
Figure 2:
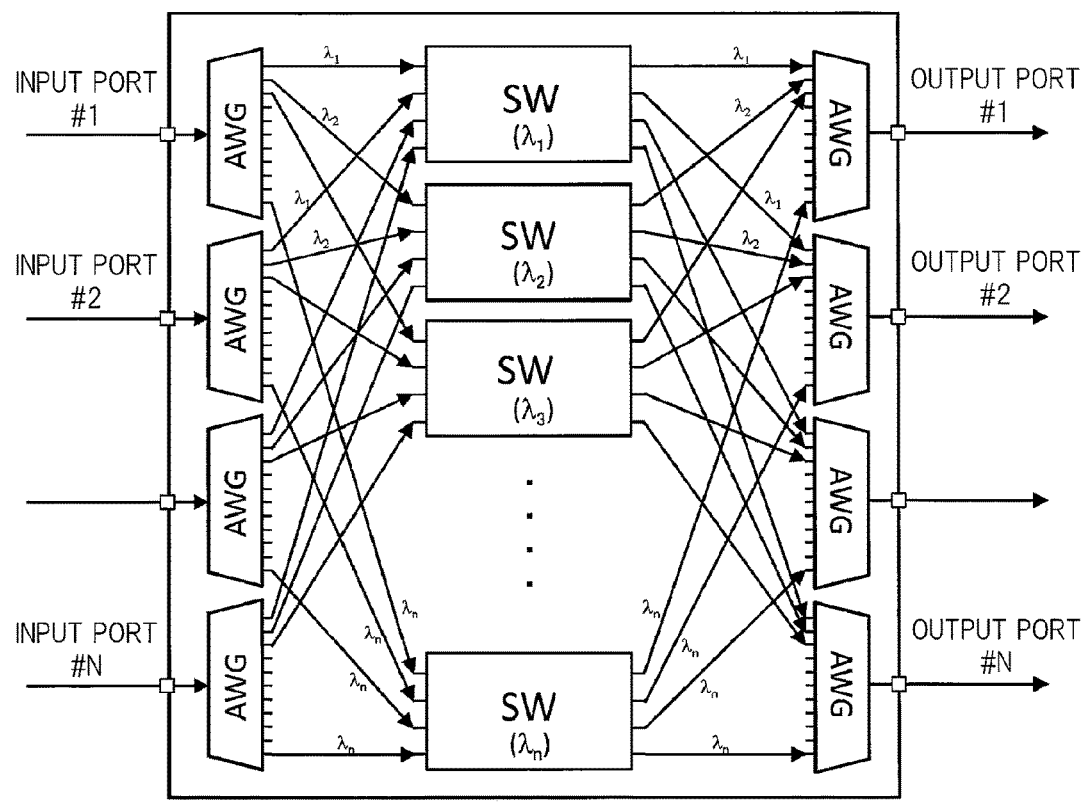
FIG. 2 is a diagram for explaining a wavelength cross connect (WXC) using an AWG.
Figure 3:
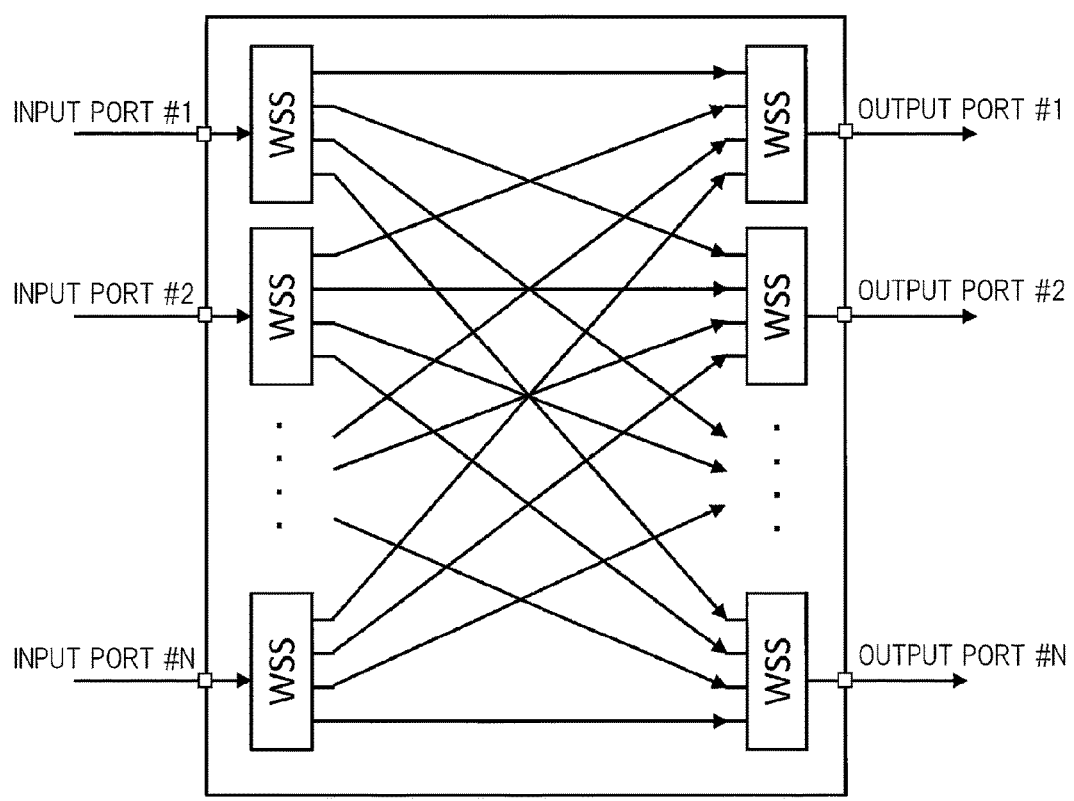
FIG. 3 is a diagram for explaining a wavelength cross connect (WXC) using a WSS.
Figure 4:
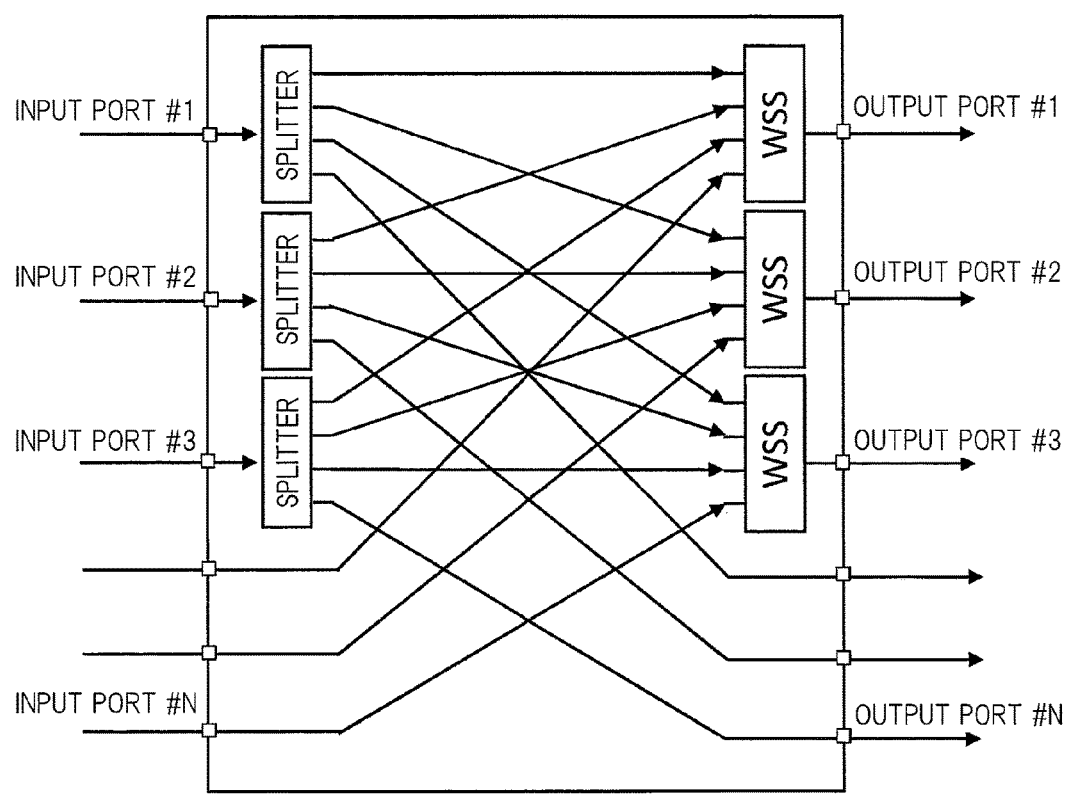
FIG. 4 is a diagram for explaining a wavelength cross connect (WXC) as a modification of FIG. 3.
Figure 5:
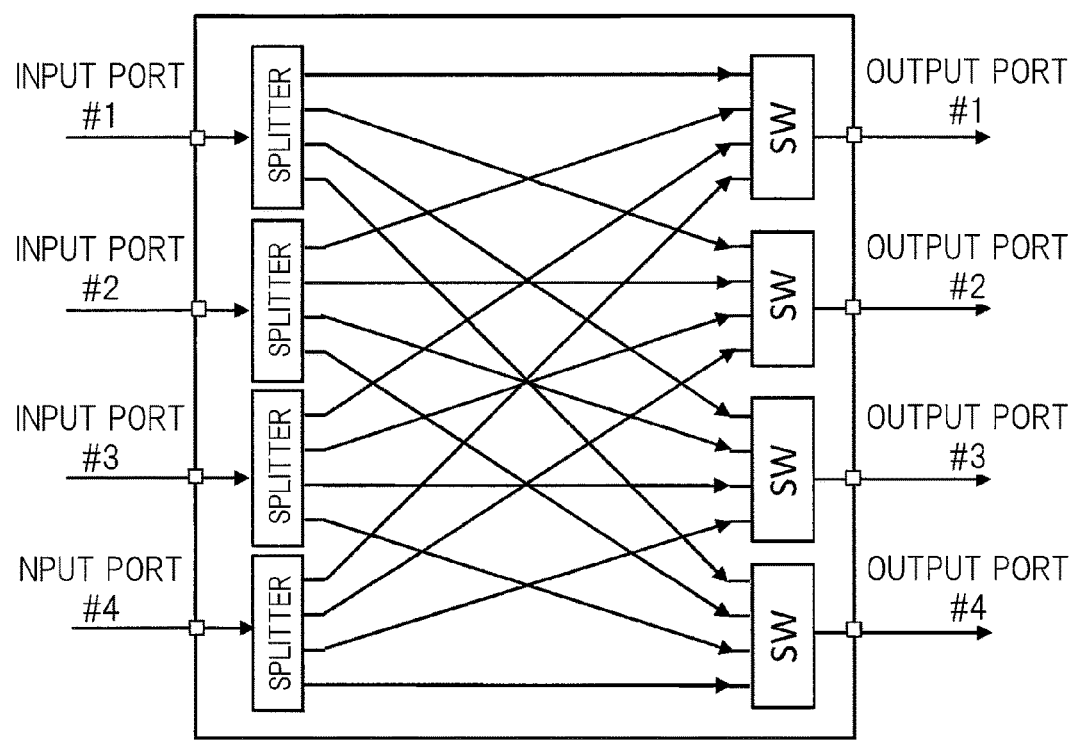
FIG. 5 is a diagram for explaining a configuration of a TPA.
Figure 6:
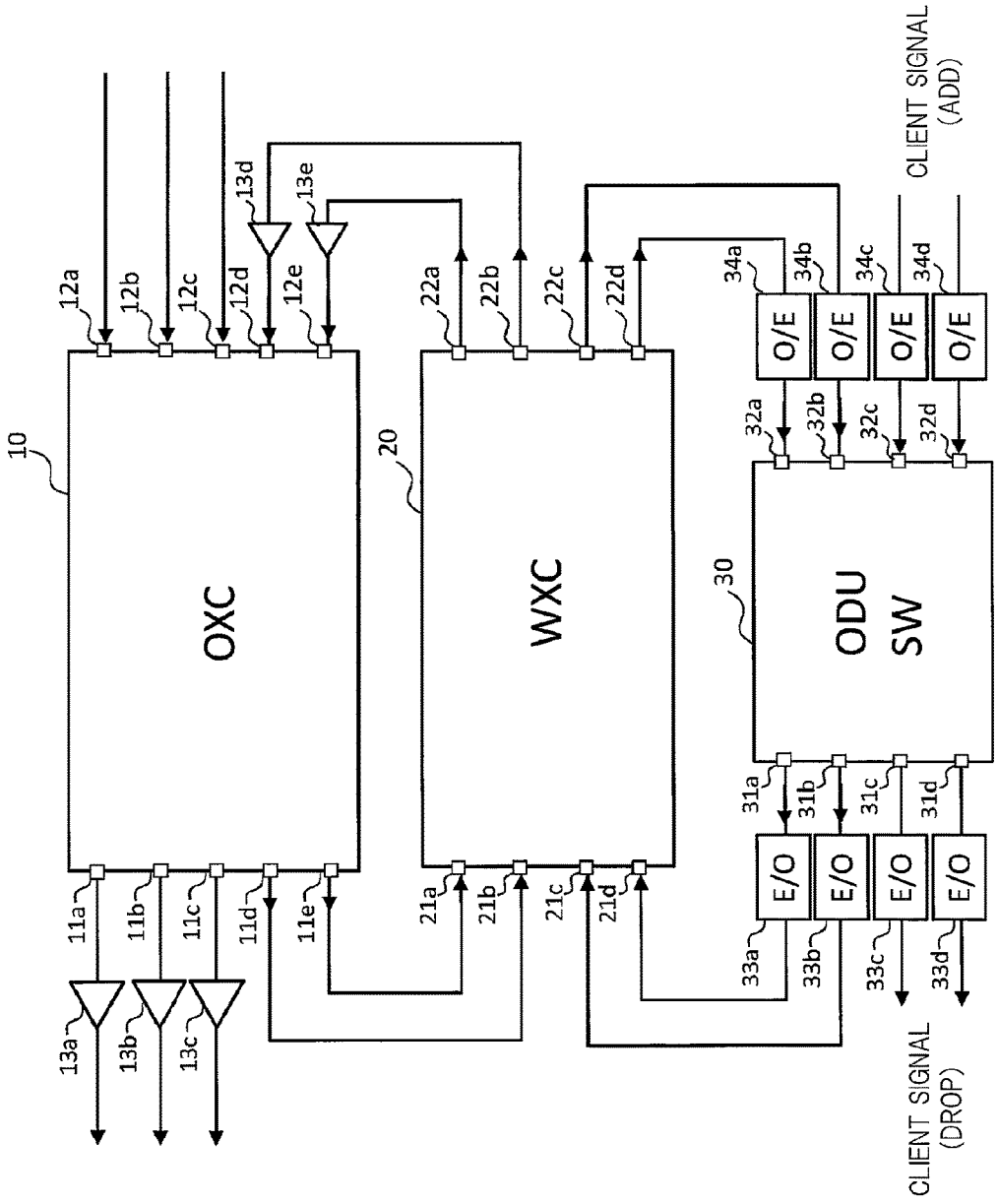
FIG. 6 is a diagram for explaining a configuration of a three-layer optical node.
Figure 8:
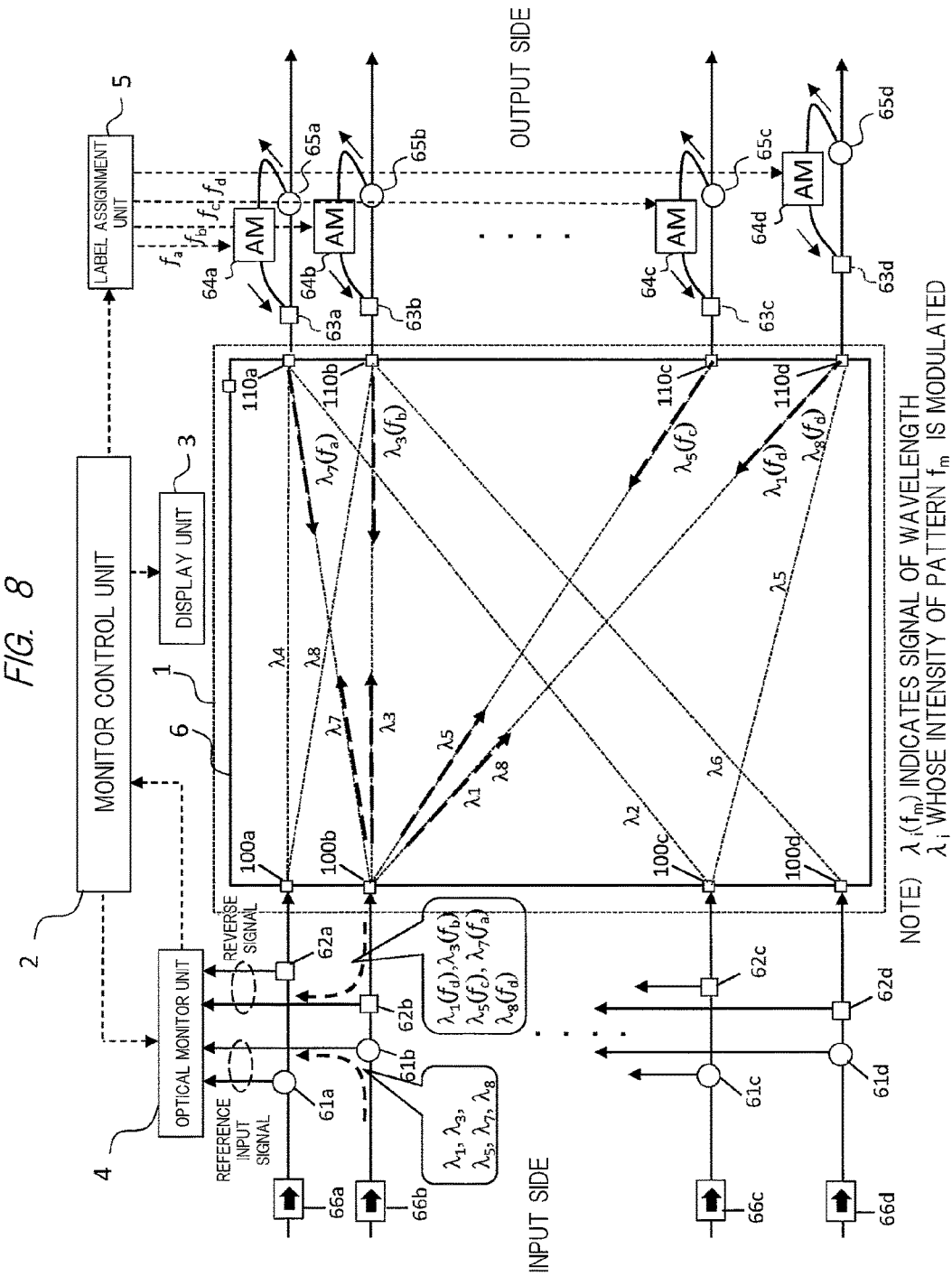
FIG. 8 is a diagram for explaining a principle of the present invention.
Figure 9:
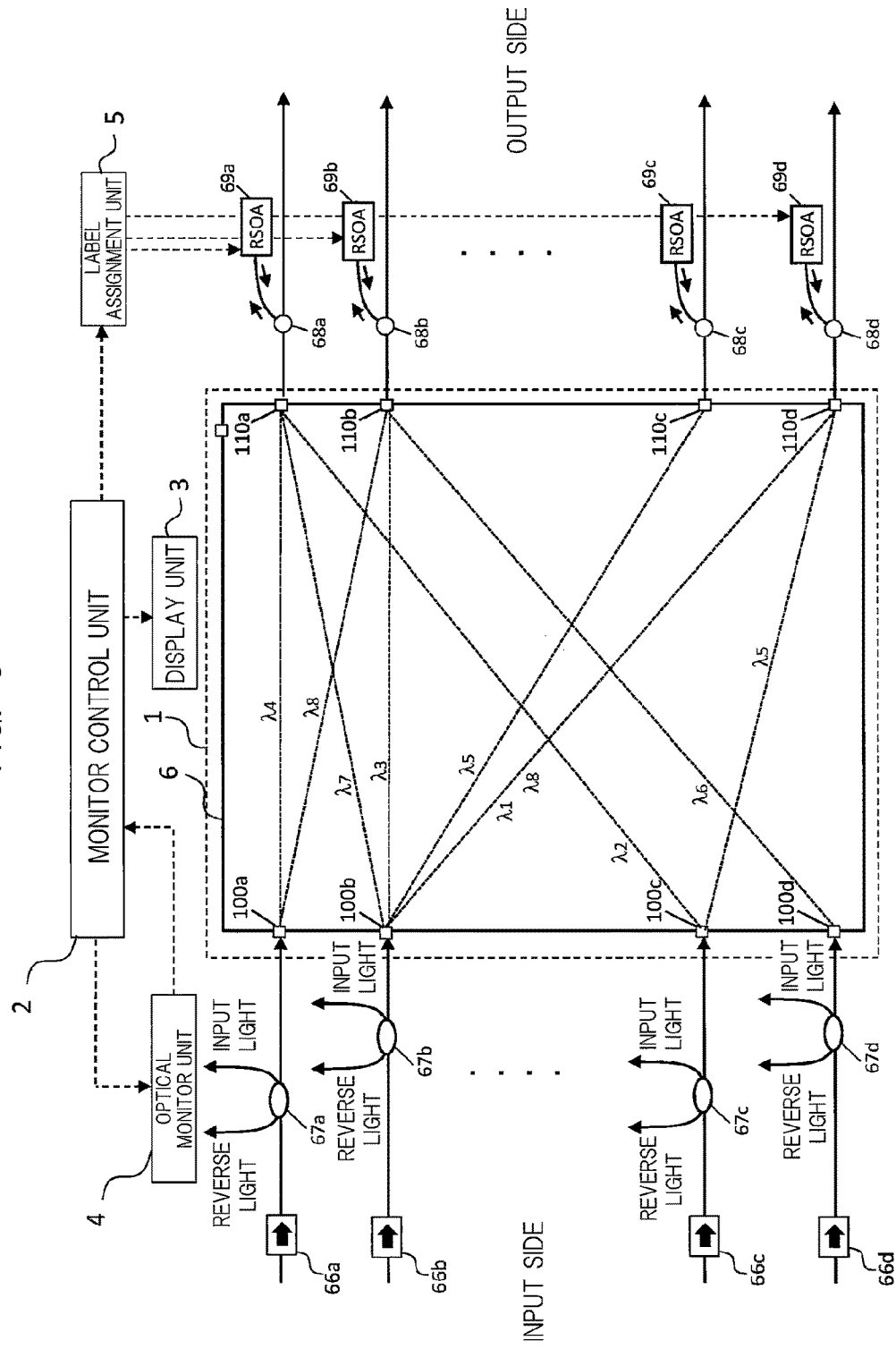
FIG. 9 is a diagram for explaining the principle of the present invention using an RSOA.

The two-layer optical node used herein uses an asymmetric WXC illustrated in FIG. 4, and a transponder (expressed as an E/O converter on an input side and an O/E converter on an output side) which transmits and receives a client signal is connected to ports (21c to 21d, and 22c to 22d, herein) in which a splitter and a WSS are omitted inside, via a TPA.

Also, a bandpass filter (87a, 87b, 88a, 88b) is inserted between the TPA and the transponder and blocks a signal having a different wavelength from a signal transmitted and received by each transponder.

An output light from an output port (11a to 11c) of an FXC 10 is amplified by an optical amplifier (73a to 73c) and transmitted to an adjacent node, and a part of the output light is guided to an intensity modulator (72a to 72c) through an optical splitter (71a to 71c) and assigned output port information, and then reversed to the output port through an optical circulator (74a to 74c).

Some of the input/output ports (21c, 21d, 22c, 22d) of the WXC 20 are connected to the TPA (40a, 40b), and a client signal is added/dropped.

An output of the TPA 40b passes through the bandpass filter (87a, 87b), is amplified by an optical amplifier (83a, 83b), and is then sent to an O/E convertor (91a, 91b), and a part thereof is guided to an intensity modulator (82a, 82b) through an optical splitter (81a, 81b) and assigned output port information and then reversed to an output port (41a, 41b) through an optical circulator (84a, 84b).

The reversed signal light in the optical node is emitted from an input port (12a to 12c) of the FXC or an input port (42a, 42b) of the TPA 40a.

These reverse lights are guided to the optical monitor unit through optical circulators (75a to 75c, 85a to 85b).

Also, as a reference signal, a part of each of an input light from an adjacent optical node and an added client signal light is guided to the optical monitor unit through an optical splitter (76a to 76c, 86a, 86b).

The optical amplifiers (73a to 73g, 83a, 83b) and optical isolators (93a to 93e) illustrated in the drawing may be omitted unless particularly needed.

Fourth Embodiment

In the above-described first to third embodiments, the intensity modulators are used as means of assigning port identification information, and as described in Means for Solving the Problems, the intensity modulators can be all substituted by phase modulators with support means added or without adding support means as needed for the optical monitor unit. Also, in the optical monitor unit, the same process as that in the case of using the intensity modulators can be carried out.

Figure 18:
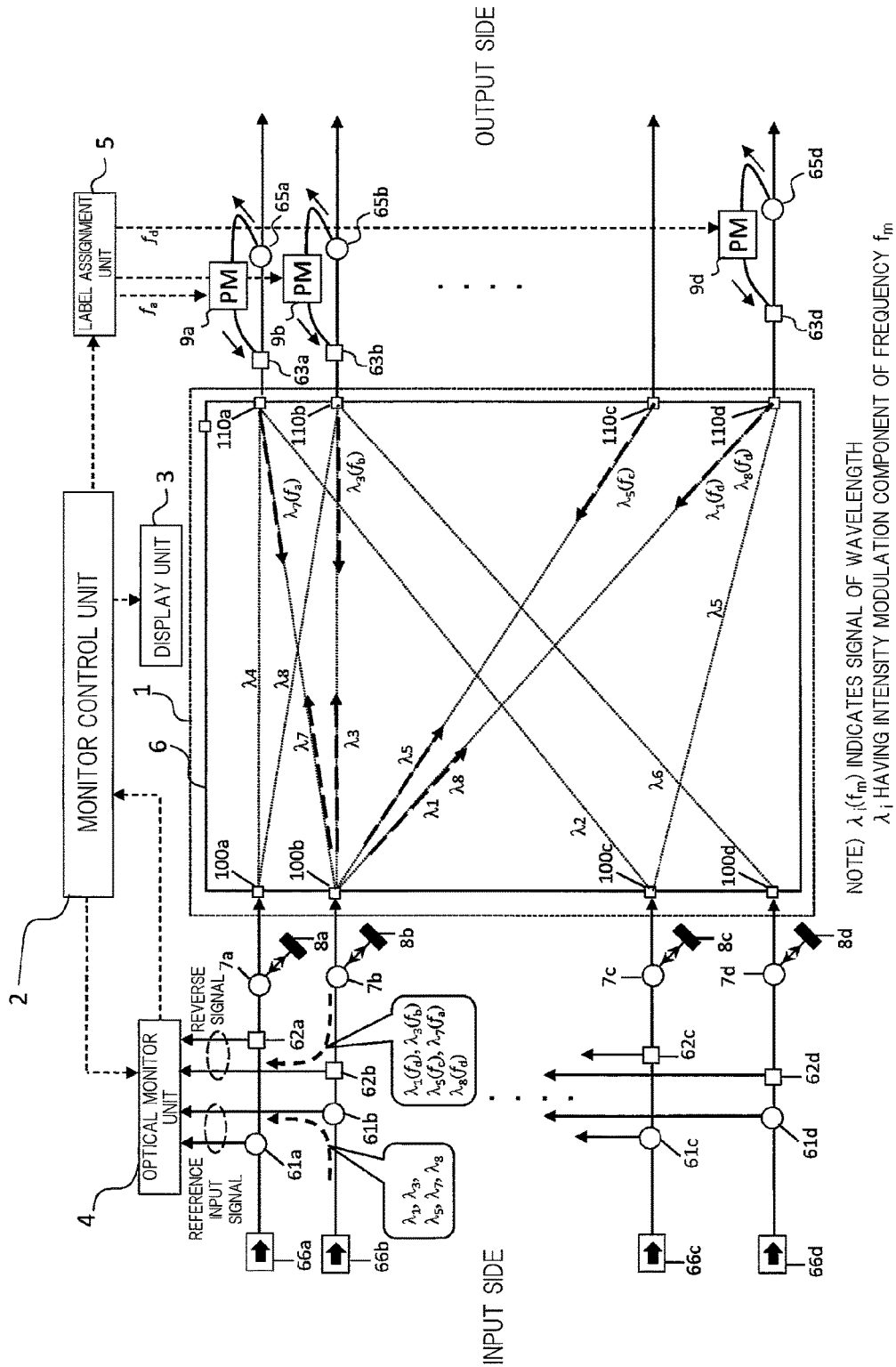
FIG. 18 is an example illustrating the principle of the present invention using phase modulation.

FIG. 18 illustrates a basic configuration of an optical node in which a phase modulator is used as means of assigning port identification and a splitter and a reflector are added to an input port as support means in the present invention, in order to make it possible to carry out the same process as that in the case of using the intensity modulator, in the optical monitor unit, and description thereof will be omitted.

Fifth Embodiment

Figure 16:
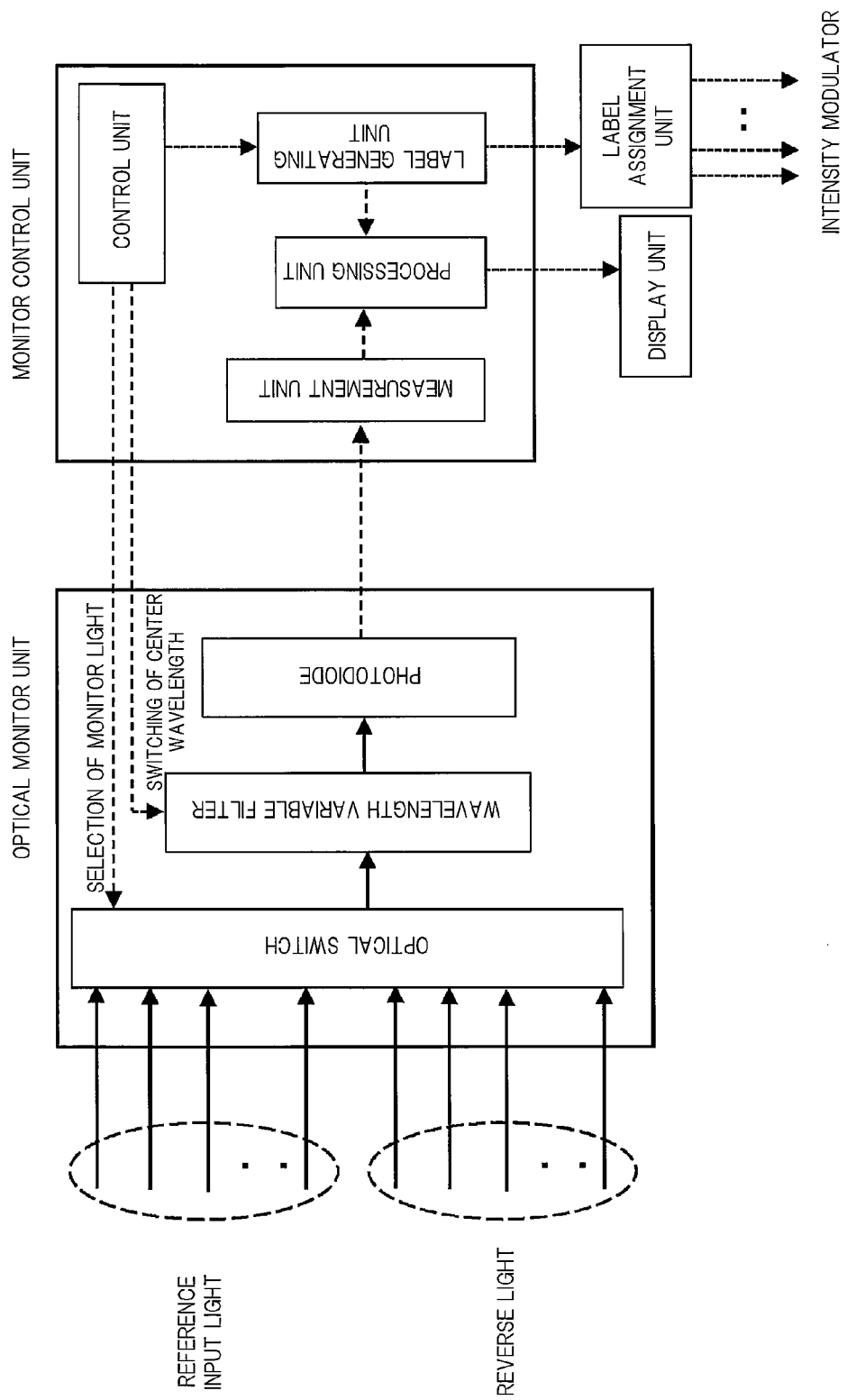
FIG. 16 is a diagram for explaining a configuration of each of an optical monitor unit and a monitor control unit.
Figure 17:
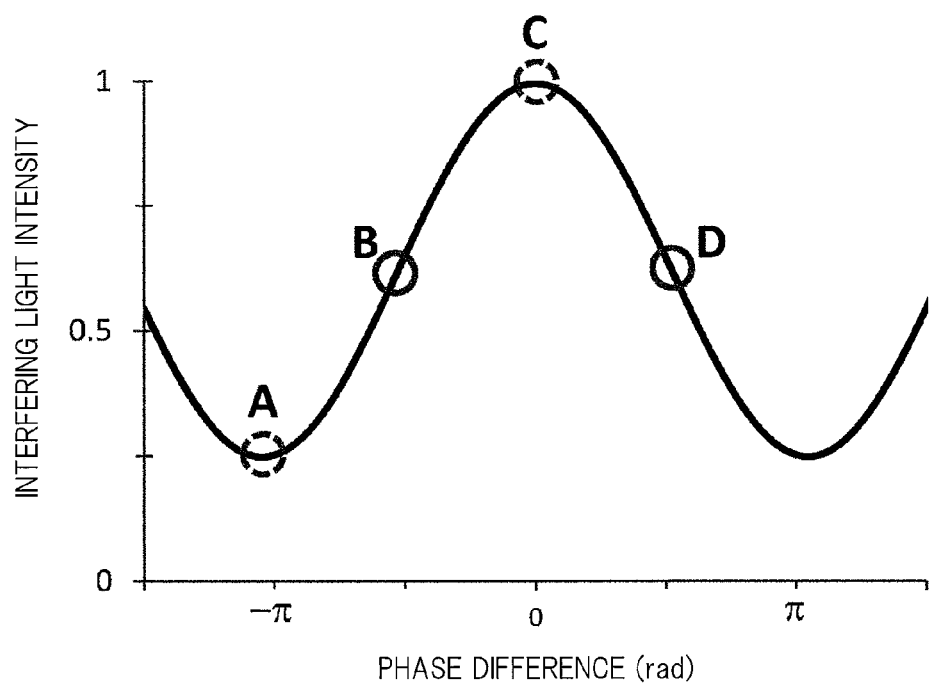
FIG. 17 is an example for explaining a phase dependency of an interfering light intensity.

FIG. 16 illustrates a configuration of each of the optical monitor unit and the monitor control unit.

In the optical monitor unit, a reference input light and a reverse light from each of the input ports are sequentially guided to the wavelength variable bandpass filter through the optical switch, and the output thereof is detected in the photodiode. The monitor control unit generates port identification information and transmits it to the label assignment unit.

Also, the monitor control unit measures an output signal of the photodiode switching a center wavelength of the filter to record a wavelength and an intensity of the signal.

Moreover, when the reverse light is monitored in the optical monitor unit, a port number is identified by a modulation pattern of the detected signal, and a result is displayed.

In FIG. 16, one optical monitor unit monitors both of the reference input light and the reverse light, and by providing two optical monitor units and monitoring separately, reduction of measurement time may be achieved.

In this case, for the reference input light, it is sufficient that only spectral measurement is performed, and accordingly, it is possible to use an inexpensive simple spectrometer, a so-called optical monitor.

In contrast, for the reverse light, since it is required to measure an intensity modulation pattern overlapped with the signal as well, a common spectrometer is not sufficient.

A photodetecting element having a band enough to measure the intensity modulation pattern is required.

Note that, although FIG. 16 illustrates a method of cutting out each signal from a monitor light by a filter and sequentially measuring an intensity modulation pattern, in a case where the signal is compliant with the DWDM grid, using the AWG and the photodiode array enables a significant reduction of measurement time by measuring all wavelengths at the same time.

Sixth Embodiment

Figure 19:
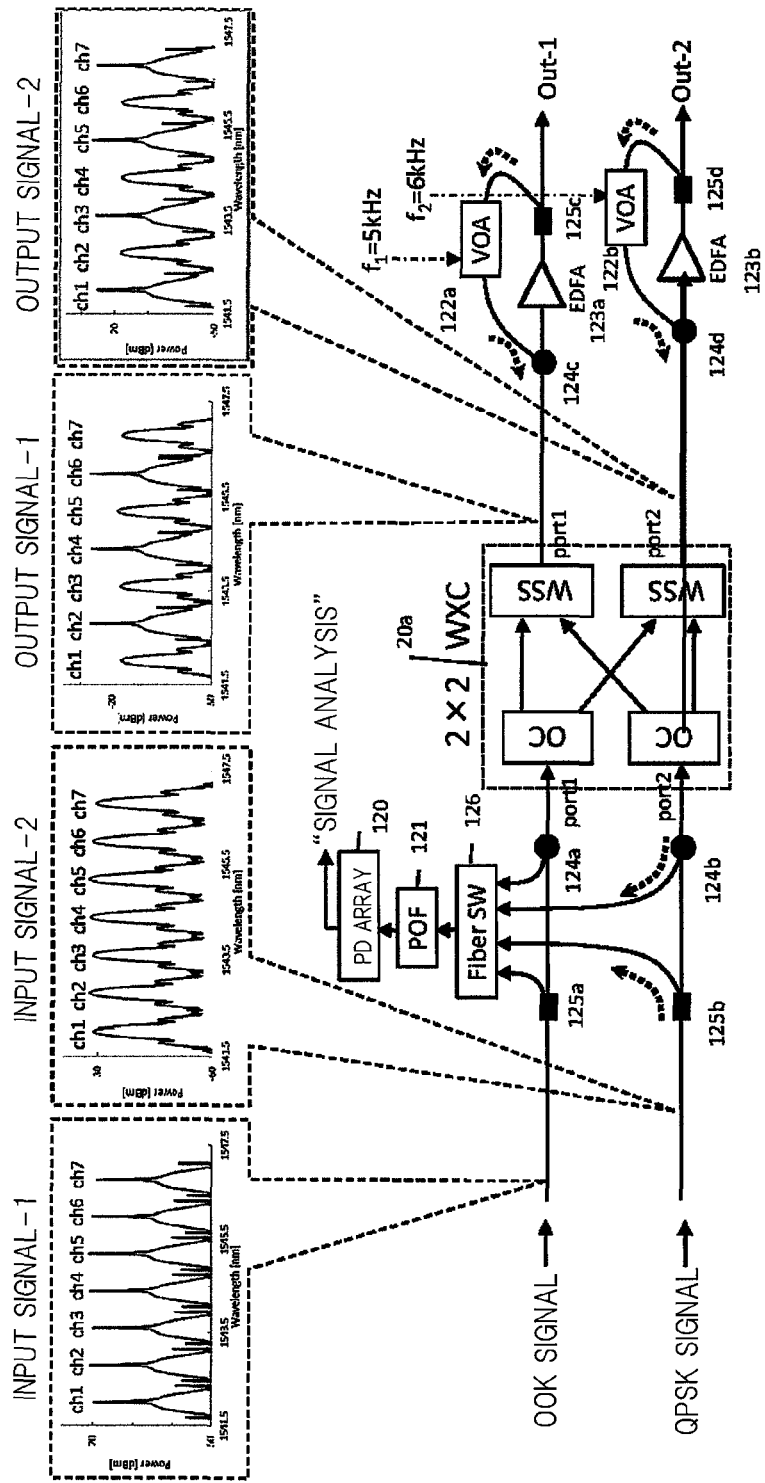
FIG. 19 is a diagram illustrating a configuration of a demonstration experiment in the case of applying to a (2×2) wavelength cross connect.

FIG. 19 illustrates a configuration of a demonstration experiment in a case where the present invention is applied to a (2×2) wavelength cross connect serving as a simplest configuration as an optical node.

A wavelength cross connect 20a includes two optical splitters and WSSs, and two kinds of WDM signals (input signal-1 and input signal-2) compliant with the WDM grid are input to two input ports.

The input signal-1 includes an OOK (on-off keying) signal (WDM grid number: n=7 to 13) having seven channels, and the input signal-2 includes a QPSK (quadrature phase shift keying) signal (WDM grid number: n=7 to 13) having seven channels.

The WDM signals (output signal-1 and output signal-2) in which even channels and odd channels of two input signals are switched are output from two output ports.

After the output signals are amplified, parts thereof are returned to the output ports through optical splitters (dropping ratio=10%) and circulators 124c and 124d, respectively.

Intensity modulation is applied to these reverse signal lights by using voltage controlled attenuators (VOA) 122a and 122b.

Each modulation frequency is set to 5 kHz on the output port 1 and 6 kHz on the output port 2.

The reverse signal light taken out of each input port is sent to a programmable optical filter (POF) 121 through an optical switch 126.

The POF simulates the AWG complaint with the WDM grid, and the WDM signals separated by the POF are respectively converted into electric signals by the photodiodes of the PD array 120.

An output of each of the photodiodes is frequency-analyzed, and a frequency of the intensity modulation applied to the signal is measured.

Figure 20:
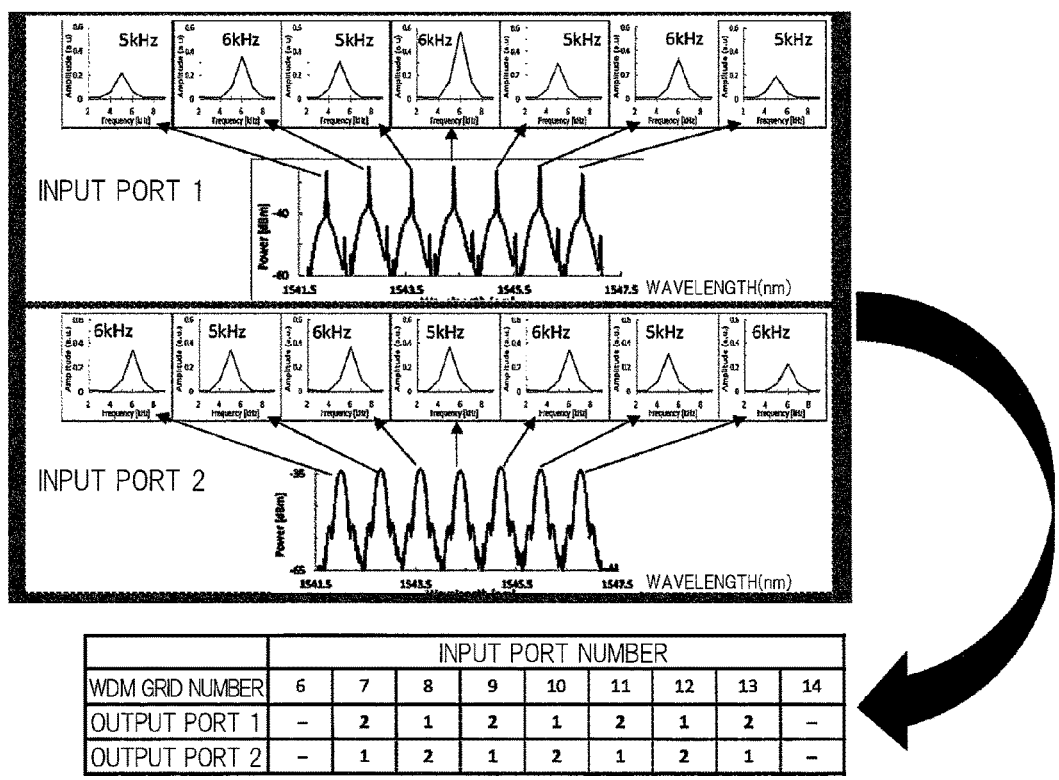
FIG. 20 is a measurement result of optical spectra of two reverse signal lights to input ports.

FIG. 20 indicates a result of the measurement.

In an upper portion of FIG. 20, optical spectra of two reverse signal lights and RF spectra of intensity modulation measured with respect to each signal are illustrated.

A peak frequency of an observed modulation spectrum is 5 kHz or 6 kHz, and it is perceived that the output ports corresponding to all of the reverse signal lights are reflected accurately.

The present invention is utilized as a single system to be attached later to a device in which optical communication and an optical switch are utilized, or as an additional feature cooperating with an existing device.

While the present disclosure has been illustrated and described with respect to a particular embodiment thereof, it should be appreciated by those of ordinary skill in the art that various modifications to this disclosure may be made without departing from the spirit and scope of the present disclosure.

What is claimed is:

1. A optical node monitoring system monitoring, in an optical node disposed on an optical network and including an optical switch provided with a plurality of input ports coupled with an adjacent node on an input side through an optical fiber on the input side and a plurality of output ports coupled with an adjacent node on an output side through an optical fiber on the output side, the optical node configured such that an input signal light having a multiplexed arbitrary wavelength and input to an arbitrary first input port among the plurality of input ports is output to an arbitrary designated first output port among the plurality of output ports as an output signal light, an optically switched state between the first input port of the input signal light having the multiplexed arbitrary wavelength and the arbitrary designated first output port, the optical node monitoring system comprising:
a label assignment unit coupled with the optical fiber connected to each of the plurality of output ports, allowing the input signal light having the multiplexed arbitrary wavelength to be optically switched to an output signal light which emits from the first output port, applying intensity modulation to the emitted output signal light in accordance with port identification information of the first output port, and then reversing the output signal light as a return light which is a reverse signal light to the first output port;
an optical monitor unit coupled with the optical fiber connected to each of the plurality of input ports and splitting a reference input light which is a part of the input signal light having the multiplexed arbitrary wavelength to each input port and the return light to the input port from the optical fiber, and monitoring each input port, the multiplexed arbitrary wavelength, a wavelength of the return light to each input port, and the port identification information of the first output port;
a display unit displaying the reference input light in each input port, the wavelength of the return light to each input port, the port identification information of the first output port, and the optically switched state; and
a monitor control unit connected to the label assignment unit, the optical monitor unit, and the display unit and monitoring and controlling the optically switched state, wherein the monitor control unit transmits the port identification information of each output port to the label assignment unit, and
wherein the display unit displays the optically switched state of the input signal light of each input port, based on the port identification information of the return light to each input port having the same wavelength as the reference input light in each input port, the port identification information obtained from the optical monitor unit through the monitor control unit.

2. The optical node monitoring system according to claim 1,
wherein the intensity modulation in the label assignment unit is an intensity modulation by an intensity modulator or an intensity modulation with respect to a gain of a reflective semiconductor optical amplifier (RSOA).

3. The optical node monitoring system according to claim 1,
wherein the intensity modulation in the label assignment unit is carried out by controlling a coupling efficiency of the return light of the output signal light and each output port.

4. The optical node monitoring system according to claim 1,
wherein the label assignment unit applies phase modulation instead of the intensity modulation allowing the return light to reverse to the first output port,
wherein a splitter coupled with a reflector is further provided to each input port,
wherein, by having the input signal light split by the splitter and allowing an input reverse light which is a signal light reflected by the reflector and the return light to interfere with each other at a ¼ wavelength difference, the return light to which the phase modulation has been applied is converted into the return light to which the intensity modulation is applied.

5. The optical node monitoring system according to claim 1,
wherein the optical monitor unit includes a wavelength variable bandpass filter and a photodiode and sequentially measures the reference input light and the return light from each input port.

6. The optical node monitoring system according to claim 1,
wherein the optical monitor unit includes an AWG (arrayed waveguide grating) and a photodiode array and measures all the multiplexed wavelengths at the same time.

7. The optical node monitoring system according to claim 1,
wherein the multiplexing is a DWDM (dense wavelength division multiplexing) grid.

8. The optical node monitoring system according to claim 1,
wherein the optical node is a two-layer optical node including a WXC (wavelength cross connect) serving as the optical switch coupled with the adjacent node through the optical fiber, and an ODU (optical data unit) switch connected to the WXC,
wherein part of a plurality of input ports of the WXC are each connected to an output port of the ODU switch via an E (electrical)/O (optical) converter,
wherein part of a plurality of output ports of the WXC are each connected to an input port of the ODU switch via an O (optical)/E (electrical) converter,
wherein the label assignment unit further assigns the port identification information to an output signal light output from each of the part of the output ports of the WXC, allowing the output signal light as the return light to reverse to the each of the part of the output ports of the WXC, wherein the optical monitor unit further monitors, in the plurality of input ports of the WXC, an input signal light from the E/O converter to each of the part of the input ports of the WXC and the return light from each of the part of the output ports of the WXC to each of the part of the input ports of the WXC, and wherein the display unit displays the optically switched state of the input signal light in each of the input ports connected to the adjacent node and the part of the input ports connected to output ports of the E/O converters, among the plurality of input ports of the WXC.

9. The optical node monitoring system according to claim 1, wherein the optical node is a two-layer optical node including an FXC (fiber cross connect) serving as the optical switch coupled with the adjacent node through the optical fiber, and a WXC serving as the optical switch connected to the FXC, wherein part of a plurality of input ports of the FXC are each connected to one of a plurality of output ports of the WXC, wherein part of a plurality of output ports of the FXC are each connected to one of a plurality of input ports of the WXC, wherein the WXC is further connected to an input TPA (transponder aggregator) inputting a client signal light and to an output TPA outputting a client signal light, wherein another input port of the plurality of input ports of the WXC is connected to an output port of the input TPA, wherein another output port of the plurality of output ports of the WXC is connected to an input port of the output TPA, wherein the label assignment unit further assigns the port identification information to an output signal light output from an output port of the output TPA, allowing the output signal light as the return light to reverse to the output port of the output TPA, wherein the optical monitor unit further monitors, in an input port of the input TPA, the client signal light and the return light to the input port of the input TPA, and wherein the display unit displays the optically switched state of the input signal light in each of the input ports connected to the adjacent node among the plurality of input ports of the FXC and the input port of the input TPA.

10. The optical node monitoring system according to claim 1, wherein the optical node is a three-layer optical node including an FXC (fiber cross connect) serving as the optical switch coupled with the adjacent node through the optical fiber, a WXC serving as the optical switch connected to the FXC, and an ODU (optical data unit) switch connected to the WXC, wherein part of a plurality of input ports of the FXC are each connected to one of a plurality of output ports of the WXC, wherein part of a plurality of output ports of the FXC are each connected to one of a plurality of input ports of the WXC, wherein another input port of the WXC is connected to one of a plurality of output ports of the ODU switch via an E/O converter, wherein another output port of the WXC is connected to one of a plurality of input ports of the ODU switch via an O/E converter, wherein the label assignment unit assigns the port identification information to an output signal light output from the another output port of the WXC, allowing the output signal light as the return light to reverse to another output port, wherein the optical monitor unit further monitors, in the another input port of the WXC, an input signal light from each of output ports of the E/O converter, and the return light to the another input port of the WXC, and wherein the display unit displays the optically switched state of the input signal light in each of the input ports connected to the adjacent node among the plurality of input ports of the FXC and the another input port of the WXC connected to the output port of the E/O converter.

11. The optical node monitoring system according to claim 1, further comprising:

a network management system, wherein the display unit displays optical signal path information set in the optical switch in the optical node and the optically switched state together by the network management system.

* * * * *